(12) United States Patent
Aung et al.

(10) Patent No.: US 11,134,067 B1
(45) Date of Patent: *Sep. 28, 2021

(54) TOKEN MANAGEMENT IN A MANAGED DIRECTORY SERVICE

(71) Applicant: Amazon Technologies, Inc., Seattle, WA (US)

(72) Inventors: Lawrence Hun-Gi Aung, Seattle, WA (US); Gaurang Pankaj Mehta, Seattle, WA (US); Krithi Rai, Redmond, WA (US); Chirag Pravin Pandya, Sammamish, WA (US); Shuo Wang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 490 days.

This patent is subject to a terminal disclaimer.

(21) Appl. No.: 15/457,273

(22) Filed: Mar. 13, 2017

Related U.S. Application Data

(63) Continuation of application No. 14/538,003, filed on Nov. 11, 2014, now Pat. No. 9,641,522.

(51) Int. Cl.
*H04L 29/06* (2006.01)

(52) U.S. Cl.
CPC .......... *H04L 63/06* (2013.01); *H04L 63/0428* (2013.01); *H04L 63/08* (2013.01); *H04L 63/10* (2013.01); *H04L 63/20* (2013.01)

(58) Field of Classification Search
CPC ..... H04L 63/06; H04L 63/0428; H04L 63/08; H04L 63/10; H04L 63/20
See application file for complete search history.

(56) References Cited

U.S. PATENT DOCUMENTS

| | | | | |
|---|---|---|---|---|
| 7,062,567 B2* | 6/2006 | Benitez | ..................... | G06F 8/65 |
| | | | | 709/217 |
| 9,160,731 B2* | 10/2015 | Chang | ................. | H04L 63/0428 |
| 9,172,724 B1* | 10/2015 | Reddy | ..................... | H04L 63/20 |
| 9,344,427 B1 | 5/2016 | Mehta et al. | | |
| 9,641,522 B1* | 5/2017 | Aung | ................. | H04L 63/0807 |
| 9,661,106 B2* | 5/2017 | Krieger | ............... | H04L 63/0428 |
| 9,819,665 B1* | 11/2017 | Machani | ............... | H04L 63/083 |
| 10,089,484 B2* | 10/2018 | Willis | ..................... | H04L 63/08 |
| 10,158,636 B2* | 12/2018 | Hennebert | .............. | H04L 63/08 |
| 10,397,731 B2* | 8/2019 | Klein | ..................... | H04L 63/20 |

(Continued)

OTHER PUBLICATIONS

D. Hardt; "The OAuth 2.0 Authorization Framework"; Internet Engineering Task Force (IETF); RFC 6749; Oct. 2012; 76 pages.

*Primary Examiner* — Oleg Korsak
(74) *Attorney, Agent, or Firm* — BakerHostetler

(57) ABSTRACT

A centralized policy management may allow for one set of credentials to various applications and services offered by a computing resource service provider or other third-party servers. Systems, methods, and computer readable medium can be configured to receive a request to access a first computing system service provided by the computing resource service provider, generate an encrypted data bundle including at least a user identifier and a data type, and transmit the encrypted data bundle to a recipient, wherein the encrypted data bundle is configured to be returned to the one or more computing devices to facilitate access to the first computing system service provided by the computing resource service provider.

20 Claims, 7 Drawing Sheets

(56) References Cited

U.S. PATENT DOCUMENTS

| | | |
|---|---|---|
| 2004/0039827 A1 | 2/2004 | Thomas et al. |
| 2015/0332029 A1* | 11/2015 | Coxe .................... G06Q 20/00 726/9 |
| 2016/0092442 A1 | 3/2016 | Gillett et al. |
| 2016/0099924 A1 | 4/2016 | Mehta et al. |

* cited by examiner

TOKEN MANAGEMENT IN A MANAGED DIRECTORY SERVICE

CROSS-REFERENCE TO RELATED APPLICATIONS

This application is a continuation of U.S. patent application Ser. No. 14/538,003, filed Nov. 11, 2014, which is incorporated herein by reference in its entirety.

BACKGROUND

Administrators frequently utilize directory services to create and maintain a directory for user and/or computing resource management and/or for providing access to a variety of computing resources (e.g., file systems, files, users, security policies, network resources, applications, system storage, etc.). The directory service may be implemented in a data server operated by an administrator (e.g., on-premises). The administrator may also manage a plurality of client devices operated by users, each of which shares a network or domain with the data server. To keep client devices secure and to ensure compatibility across the domain, the data server may assign and enforce security and access control policies on the client devices and install or update software running on the client devices. However, implementing such security and access control policies requires the generation of multiple tokens (e.g., access tokens, refresh tokens, etc.). As the number of applications, webpages, users, and client devices that are accessing the directory service increases, the number of tokens increases, requiring additional storage and processing resources to effectively manage the policies.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
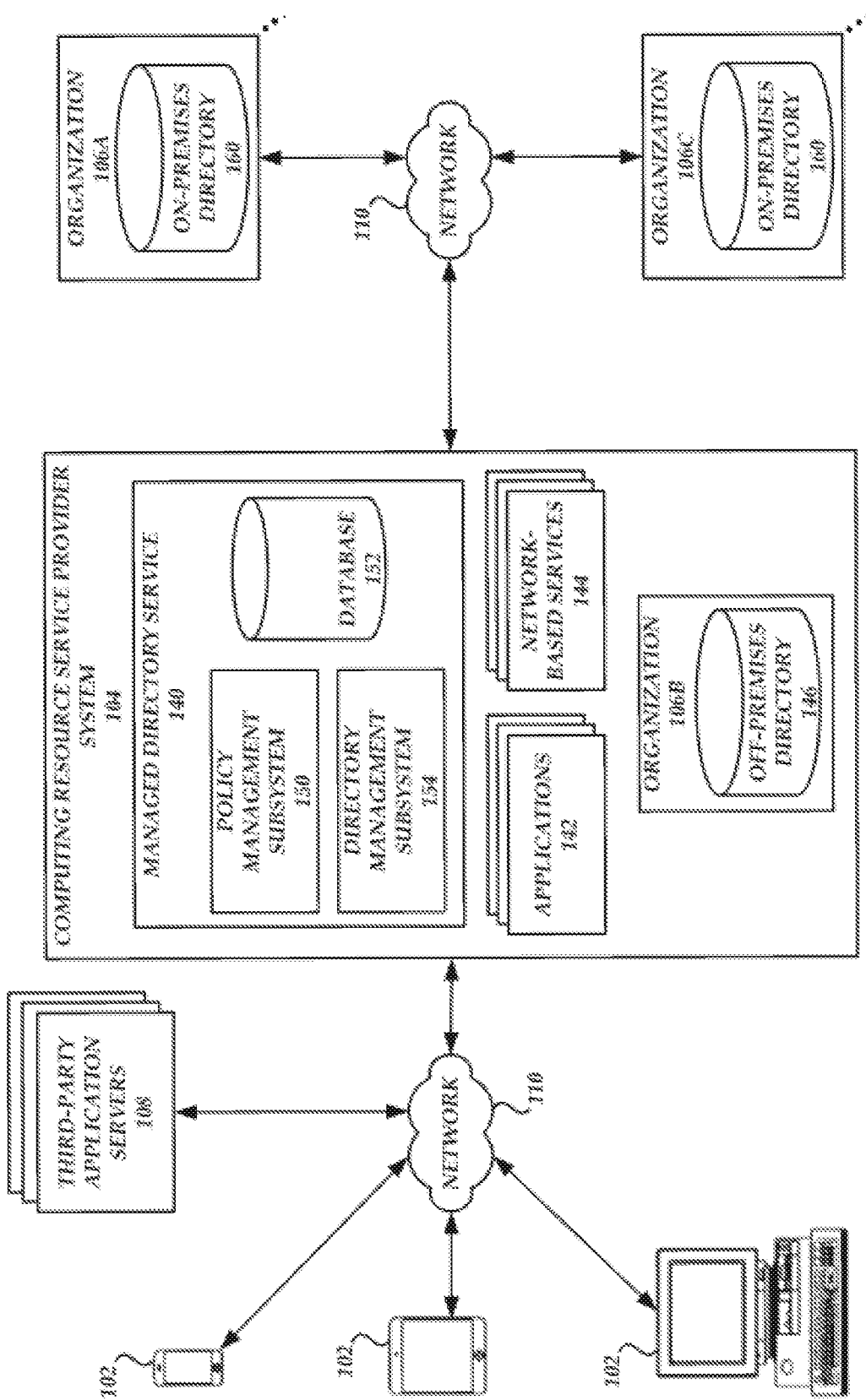
FIG. 1 shows an example network environment in which directory management features of the present disclosure can be implemented according to some embodiments.

As described above, on-premises data servers that implement directory services can be burdensome. Thus, in some conventional systems, a managed directory service (e.g., a system that stores, organizes, and provides access to information in a computer operating system's directory, an example of such a directory being Samba or MICROSOFT® Active Directory®) can be implemented by a centrally-managed data server that is located remotely and shared by a plurality of administrators and/or organizations. For example, a computing resource service provider may operate the managed directory service. The managed directory service may manage a plurality of directories (e.g., referred to herein as off-premises directories). The centrally-managed data server may provide access to the managed directory service via a network (e.g., the Internet) and an administrator associated with an entity (e.g., an organization) may use existing network-enabled client devices to manage the directory. Accordingly, the entity can implement a directory service without having to install or maintain the infrastructure normally used to implement the directory service.

The administrator associated with the entity may create credentials for users so that the users can access the managed directory service. The administrator may also assign policies to each of the users such that users may have different levels of access to the managed directory service. In some cases, the entity that uses the managed directory service may also have access to other services provided by the computing resource service provider or be a customer of another computing resource service provider that operates other services, such as virtual computer system services, object-based data storage services, database services, and/or the like.

A centralized policy management system is described herein such that one set of credentials (e.g., a username and password combination) may be used to access a managed directory service and one or more other services or applications provided by one or more other computing resource service providers. In an embodiment, the entity (e.g., an administrator associated with the entity) responsible for the administration of a directory made available through the managed directory service specifies one or more policies for users and/or groups of users that utilize the directory. For example, the managed directory service may include a policy management subsystem that manages a set of policies for users and/or groups of users. The policies may control access by the users and/or groups of users to applications and/or resources managed by the directory and/or services provided by the other computer resource service provider. Example policies may include policies that prevent a user or a group of users from executing a particular application (e.g., word processing application, photo editing application, etc.) within the directory, policies that prevent a user or a group of users from accessing a virtual computer system service provided by the other computing resource service provider, policies that allow a user or a group of users to only execute read actions on data stored within a database service provided by the other computing resource service provider, and/or the like.

To access the managed directory service or other services provided by another computing resource service provider, a user may visit a page (e.g., a content or network page, such as a web page) that corresponds with an entity that the end user belongs to. The page may include a list of available applications (e.g., word processing applications, electronic mail applications, photo editing applications, etc.) and/or services (e.g., the managed directory service or other services offered by a computing resource service provider). Alternatively, the user can enter an address that corresponds with a page of a specific application or service. After selecting the desired application or service (or directly visiting the page of the desired application or service), the user may be redirected to a login page. The user can enter his or her credentials, which are then authenticated via the managed directory service. Such authentication may result in the provisioning of an authorization code to the user. As an example, the computing resource service provider may generate a redirect Uniform Resource Identifier (URI) including the authorization code to allow the user to access a computing resource service provider interface that displays features of the selected application(s) or service(s). In an aspect, when the URI is used to access the computing resource service provider interface, the policy management subsystem within the managed directory service may obtain the defined user policies to determine the parameters for access to the various services provided by the computing resource service provider. Once the user policies have been obtained, the policy management subsystem may communicate with a credential exchange subsystem associated with the service(s) or application(s) that the user is trying to access, such as through one or more appropriately configured application programming interface (API) calls to the credential exchange subsystem, to request temporary credentials (e.g., access token) associated with the service(s) or application(s) the user has been granted access to. Accordingly, these temporary credentials (e.g., access token, refresh token, etc.) may be transmitted to the policy management subsystem in order to provide the user with access to the permissible services and operations. Additionally, the policy management subsystem may further communicate with the credential exchange subsystem to provide the user-specific or group-specific policies that are to be enforced. Once the policy management subsystem has received the temporary sets of credentials and has transmitted the policies to be enforced to the credential exchange subsystem, the policy management subsystem may enable the user to access the customized computing resource service provider interface.

In another aspect, the communication of information between the various systems, subsystems, and user-facing components can be concatenated and/or encrypted as a data bundle to minimize data load and look-up requirements, for example. As described herein, a user identifier (e.g., universal unique identifier (UUID)) can be encrypted with additional data such as a data type, expiration time, name directory, domain identifier, version, or other information to form an encrypted data bundle. The encrypted data bundle can be transmitted between systems, subsystems, applications, and devices. In certain aspects, the encrypted data bundle can operate as pass-through data to a device that is not configured to decrypt the data bundle. In other aspect, the encrypted data bundle can be decrypted to expose the underlying data, which can be processed to facilitate access to one or more services.

FIG. 1 shows an example network environment in which directory management features of the present disclosure can be implemented according to some embodiments. As used herein, the term "directory" generally refers to an organized collection of data about users, devices, applications, and/or other common resources of a computer network. Each resource on a computer network (or some subset thereof) may be represented as an object in a directory, and information about a particular resource (e.g., name, address, permissions, etc.) can be stored as attributes of that object. Information can be securely stored within or in association with the object such that only users with sufficient permissions are able to access, modify, or otherwise use the information. As used herein, the term "policy" generally refers to a set of rules that governs what applications, services, and/or computing resources a user or a group of users can access, modify, or otherwise use and the extent of the access.

As shown, the network environment includes various user devices 102, a computing resource service provider system 104, organizations 106, and third-party application servers 108 in communication via one or more networks 110. The computing resource service provider system 104 can provide applications, managed directory services, and/or other network-based services to various organizations or other customers. Organizations 106A-C (or other customers) can employ the computing resource service provider system 104 to provide application access to users associated with the organizations, manage the organizations' directories, etc. For example, administrators (or other users) associated with the organizations 106A-C can use user devices 102 to access the computing resource service provider system 104 to generate policies for individual users or groups of users that govern their access to the various applications or services provided by the computing resource service provider system 104. Individual users can use user devices 102 to select one or more policies and access applications hosted by the computing resource service provider system 104 or other computing resource service providers (e.g., via third-party application servers 108) using credentials from their respective organizations 106A-C according to the selected one or more policies.

The user devices 102 can correspond to a wide variety of computing devices, including desktop computing devices, laptop computing devices, terminal devices, mobile phones, tablet computing devices, media players, wearable computing devices (e.g., smart watches, smart eyewear, etc.), and various other electronic computing devices and appliances having one or more computer processors, computer-readable memory and network-access capabilities. Some user devices 102 may be associated with a particular organization 106A-C. For example, an organization may have various user devices 102 that remain on-premises, or that are used off-premises primarily by employees or other users associated with the organization. In some embodiments, some or all of the user devices 102 may be separate from any organization, such as public computers or home computers that are used by any number of users to perform various tasks, which may include accessing applications using credentials associated with a particular organization 106A-C or other customer of the computing resource service provider system 104.

The computing resource service provider system 104 can be a computing system configured to host or otherwise provide access to a managed directory service 140 that manages directories for separate customer organizations 106A-C, applications 142, and/or other network-based services and resources 144. For example, the computing resource service provider system 104 can be a server or group of servers that may be accessed via a communication network 110. The computing resource service provider system 104 can include a number of components to provide various features described herein, such as the managed directory service 140, one or more applications servers or applications 142, and other network-based resources 144, that can be accessed by organizations 106 and/or user devices 102. The computing resource service provider system 104 may also include various data stores, such as an off-premises directory 146 (e.g., data store) to store directory information for customer organization 106B. In some embodiments, the computing resource service provider system 104 may include additional or fewer components than illustrated in FIG. 1.

As used herein, the term "off-premises directory" refers to a directory that is remote from the organization with which it is associated, in order to distinguish such a directory from a directory that is located on an organization's premises. Thus, although a directory may be physically stored on the premises of a computing resource service provider system 104, the directory may nevertheless be referred to as an off-premises directory because it is off-premises with respect to the organization to which it belongs (e.g., the organization that owns or operates the network described by the directory). Additionally, although a directory may be physically stored off the premises of the computing resource service provider system 104, the directory may nevertheless be referred to as an on-premises directory because it is on-premises with respect to the organization to which it belongs.

The managed directory service 140 may be accessible by an administrator associated with an organization 106A-C via a user device 102 to manage various aspects of one or more directories associated with the administrator's organization 106A-C. In some embodiments, the managed directory service 140 includes a directory management subsystem 154 that manages the various aspects of the one or more directories associated with the administrator's organization 106A-C. For example, the directory management subsystem 154 can be used to access and/or manage the off-premises directory 146 associated with the organization 106B as well as the on-premises directories 160 associated with the organizations 106A and 106C. As a further example, the off-premises directory 146 can be part of the managed directory service 140 or in communication therewith.

The managed directory service 140 may also provide a variety of services to enable computer systems and/or user devices 102 to access other system resources, such as authentication and/or authorization services. The authentication services may authenticate credentials of a user to determine whether the user is authorized to access the managed directory service 140 and/or the other system resources associated with the managed directory service 140. The credentials may be authenticated by the managed directory service 140, by a process, program, or service under the control of the managed directory service 140, by a process, program, or service that the managed directory service 140 may communicate with, and/or any combination thereof. The authorization services may authorize a user to determine what actions, if any, the user can perform (e.g., creating file systems on a file system resource, destroying file systems on the file system resource, attached to file systems, detaching from file systems, providing access links to file systems, reclaiming access links to file systems, allowing reads from file systems, allowing writes to file systems, etc.).

The managed directory service 140 may additionally include a policy management subsystem 150 that may be configured to allow an administrator associated with an organization 106A-C to select one or more profiles that define remote access to the managed directory service 140, applications 142, other network-based services/resources 144, and/or applications provided by the third-party application servers 108. For example, the administrator, using user device 102, may access the policy management subsystem 150 to allow a user (e.g., an employee of an organization 106A-C) to access a word processing application provided by applications 142 and a virtual computer system service provided by the other network-based resources 144 while prohibiting access to other applications and services.

The administrator may also be able to generate and/or modify policies. For example, when an administrator requests to create or modify a policy, the policy management subsystem 150 (or a related service that the policy management subsystem 150 redirects to) may allow the administrator to generate new policies and/or modify existing policies, and the new policies or updated policies may then be provided to the policy management subsystem 150 if generated by a related service such that the administrator can select and assign policies to users or groups of users. In some embodiments, after a new policy is created, the policy management subsystem 150 automatically assigns selected users and/or groups of users to the new policy.

The policy management subsystem 150 may also allow users associated with an organization 160A-C to select one or more policies made available to the user or to the group that the user belongs to by the administrator. The selection may be made after the user's credentials are authenticated and before the user is redirected to the application or the service that the user is attempting to access.

The managed directory service 140 may also include a database 152 that stores template policies and/or custom policies and/or mappings of policies to users and/or groups of users and/or information relating to authorization codes, access tokens, refresh tokens, and user profiles, for example. For example, the policy management subsystem 150 may be in communication with the database 152 to store policies associated with an organization 106A-C and retrieve the stored policies as well as the mappings when an administrator attempts to manage user and/or group policies or when a user attempts to access an application or service. In other embodiments, not shown, the template policies, custom policies, mappings, and/or information relating to authorization codes, access tokens, and/or refresh tokens may be stored in separate databases within the managed directory service 140 that are both accessible by the policy management subsystem 150.

In an embodiment, the policy management subsystem 150 generates a URI to redirect a user device 102 operated by a user to a computer resource service provider interface to access applicable applications or services. The URI may be generated after the user's credentials are authenticated and/or the user has chosen one or more policies. Alternatively, the URI may be generated once an administrator has assigned one or more policies to the user or the group that the user belongs to. The generated URI may allow the user to access the applicable applications or services in accordance with the selected policies. The URI may be transmitted directly to the user device 102 or may be transmitted to the user via an electronic message (e.g., electronic mail, text message, etc.).

When the user uses the URI to access the computing resource service provider interface, the policy management subsystem 150 may determine the policies selected by the user. Based at least in part on these policies, the policy management subsystem 150 may transmit one or more executable instructions to a credential exchange subsystem of the application or service for which access is requested (not shown) to obtain temporary credentials for accessing the applications 142, the other network-based resources 144, and/or applications provided by the third-party application servers 108 and/or to define one or more actions the user may undertake within these applications or services. Once the policy management subsystem 150 has obtained these credentials, the policy management subsystem 150 may generate a user-specific computing resource service provider interface and enable the user to access the applications 142, the other network-based resources 144, and/or applications provided by the third-party application servers 108 according to the policies selected by the user.

The computing resource service provider system 104 may be a single computing device, or it may include multiple distinct computing devices, such as computer servers, logically or physically grouped together to collectively operate as a server system. The components of the computing resource service provider system 104 can each be implemented as hardware, such as a server computing device, or as a combination of hardware and software. In addition, the components of the computing resource service provider system 104 can be combined on one server computing device or separated individually or into groups on several server computing devices. In some embodiments, the features and services provided by the computing resource service provider system 104 may be implemented as web services consumable via the communication network 110. In further embodiments, the features and services are provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The organizations 106A-C can correspond to various customers of the computing resource service provider system 104. Although the term "organization" is used herein, the features involving such organizations may additionally or alternatively involve any customer or other entity having a directory (whether on-premises or off-premises) and wishing to use the computing resource service provider system 104 to manage access to the directory by applications hosted by the computing resource service provider system 104 or third-party application servers 108.

Organizations that maintain on-premises directories 160 may have one or more servers on which the directories 160 are stored. For example, organization 106A may have a data center that includes various servers, and an on-premises directory 160 may be stored on one or more of the servers. Organizations that maintain off-premises directories may employ the services of the computing resource service provider system 104, which may store the off-premises directory in an association with the respective organization. For example, organization 106B may not maintain an on-premises directory at all, but may rely instead on the computing resource service provider system 104 to maintain the organization's directory. Some organizations may choose to maintain directories both on-premises and off-premises. For example, organization 106C may store an on-premises directory 160 in a manner similar to organization 106A, described above, and the organization 106C may also choose to employ the computing resource service provider system 104 to maintain a directory. The directory maintained by the computing resource service provider system 104 in this example may be a mirror or subset of the on-premises directory (e.g. for backup or disaster-recovery purposes), or it may be a separate directory altogether (e.g., a directory of computing resources in a different region from the on-premises directory 160).

The communication network 110 may be a publicly accessible network of linked networks, possibly operated by various distinct parties, such as the Internet. In some embodiments, the communication network 110 may be or include the Internet, a private network, personal area network, local area network, wide area network, cable network, satellite network, cellular telephone network, etc. or combination thereof.

Figure 2:
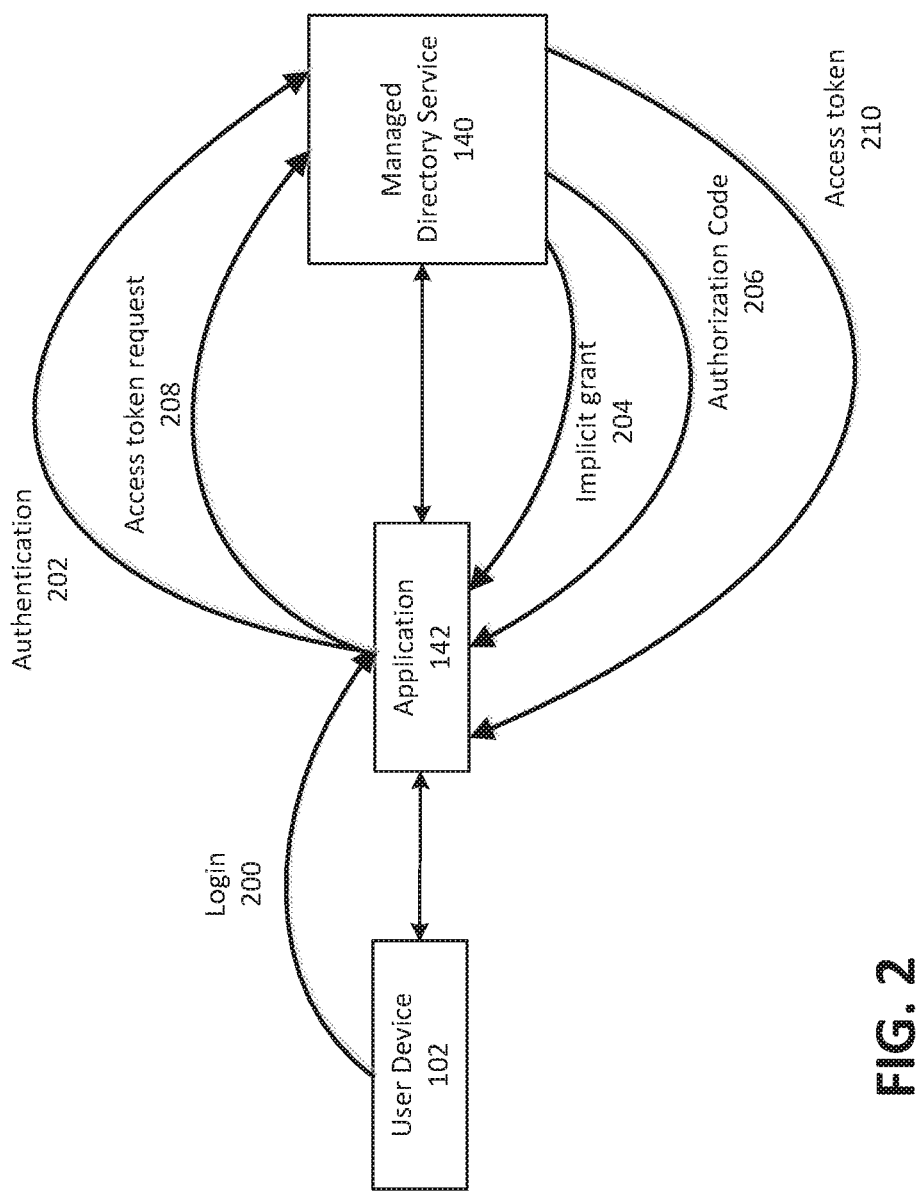
FIG. 2 shows interactions between the various components of FIG. 1 during the process of granting access to services.

FIG. 2 shows interactions between the user device 102, one or more of the application 142, and the managed directory service 140 (which may include, or be in communication with, the policy management subsystem 150, the directory management subsystem 154, on-premises directory 205, off-premises directory 210, and/or the database 152) during the process of accessing a computing resource.

A user can request access to a particular information or service, for example, via one or more websites (using a browser) or applications 142. At 200, a user can login and can grant the website or application access to a customer profile data. Customer/user profile data can comprise a user identifier (e.g., universal unique identifier) for the user, user name, the user email address, user postal code, or other user-related information. In an aspect, the user can provide user credentials to the application 142 via a user interface (e.g., rendered login screen/page) of the user device 102.

At 202, the user credentials can be transmitted to the managed directory service (or associated authentication service) to be authenticated. Once the user is authenticated, an access token can be provided to facilitate access to the application. As an example, a session identifier can be used to represent each authentication attempt and/or successful authentication with a unique identifier. As a further example, even when the same user credentials are authenticated in separate authentication attempts, the session identifier can be used to distinguish one attempt from another. The access token can comprise an alphanumeric code. The access token can have limited validity duration (e.g., sixty minutes) and can be specific to the user logging.

At 204, the access token can be provided via an implicit grant. In the implicit grant, the access token or an emulation/representation of the access token can be embedded directly in a redirection universal resource identifier (URI), for example, as a URI fragment. (This is the implicit grant). The URI fragments, including the access token, can be stripped from the redirection URI by a user-agent (e.g., the application 142, a web browser, etc.) and the user-agent executes the URI. In an aspect, the access token can be emulated by encrypting a bundle of data (e.g., the user identifier, a data type, an expiration time, name directory, domain identifier, version, etc.). Instead of an actual access token, the encrypted data bundle can be included as the URI fragment and used as a query back to the managed directory service 140. As such, the managed directory service 140 can decrypt the data bundle and can expose the underlying information. Such information can comprise a location of the actual access token that can be leveraged for providing access to the requested service.

At 206, if an implicit grant is not used, an authorization code can be provided to the application 142. The authorization code or an emulation/representation of the authorization code can be embedded directly in a redirection URI as a query parameter. As an example, the user-agent executes the URI, including the query parameters. The query parameters can be processed (along with a user identifier) to request an access token, at 208. Once the authorization code and client identifier are verified, the application 142 is granted an access token (e.g., and a refresh token), at 210. In an aspect, the access token can be emulated by encrypting a bundle of data (e.g., the user identifier, a data type, an expiration time, name directory, domain identifier, version, etc.). Instead of an authorization code, a first encrypted data bundle can be included as the URI fragment and used as a query back to the managed directory service 140. As such, the managed directory service 140 can decrypt the first data bundle and can expose the underlying information. Based on the information in the first data bundle, a second data bundle can be encrypted and transmitted to emulate one or more of an access token and a refresh token. As an example, the access token can be used to access customer profile data and/or services. When the access token expires, the refresh token can be used to gain a new access token and a new refresh token. In another aspect, instead of passing the actual tokens, the encrypted data bundles can be used to pass limited information that can be linked to the actual tokens (e.g., stored on a database).

Figure 3:
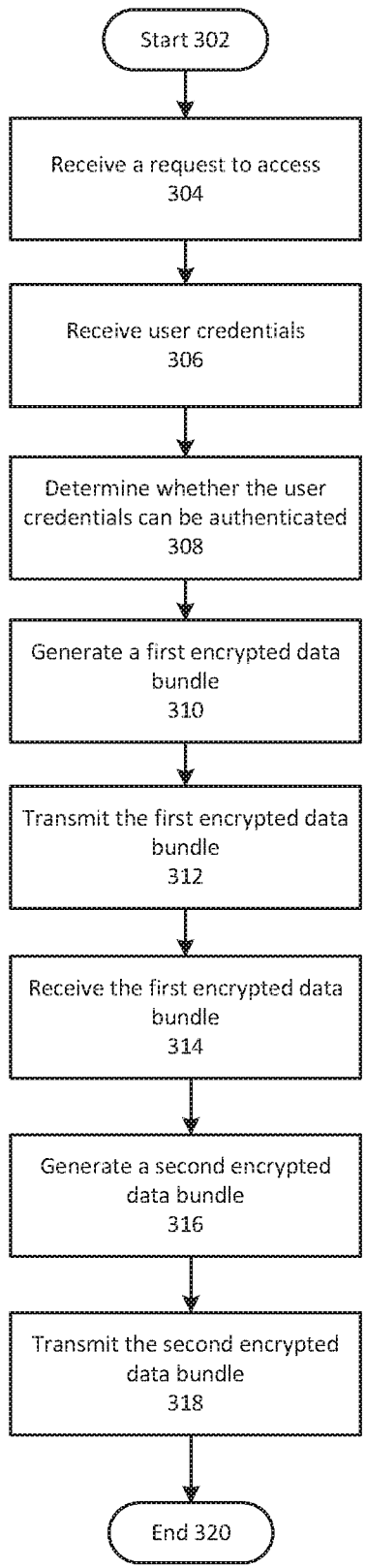
FIG. 3 illustrates a process for providing access to an application or service.

FIG. 3 illustrates a process 300 for providing access to a service. As an example, the managed directory service 140 of FIG. 1 can be configured to execute the process 300. The process 300 can begin at block 302. However, the process 300 can be executed in any order or sequence and can comprise any number of operations including a single operation.

At block 304, a request to access a service provided by a computing resource service provider is received from an end user device or an application in communication with the end user device. For example, the end user device may be operated by a user associated with an organization, such as the organizations 160A-C.

At block 306, user credentials associated with a user are received from the end user device. The user credentials may include a username and password combination.

At block 308, a determination can be made whether the user credentials can be authenticated. For example, a managed directory service may be contacted to perform the authentication. The managed directory service may manage one or more directories operated by the organization with which the user is associated. If the user credentials can be authenticated, the selection and access process 300 can proceed, for example, to block 310 or other operations. Otherwise, the selection and access process 300 can end at block 322. As an example, a session identifier can be used to represent each authentication attempt and/or successful authentication with a unique identifier. As a further example, even when the same user credentials are authenticated in separate authentication attempts, the session identifier can be used to distinguish one attempt from another.

At block 310, in response to authentication of the user credentials, a first encrypted data bundle can be generated. The first data bundle can include at least a user identifier associated with the user credentials and a first data type and can be encrypted using various encryption techniques such as the advanced encryption standard (AES). The first data type can comprise an authorization code, an access token, or a refresh token, or a combination thereof. The first encrypted data bundle can comprise the session identifier.

At block 312, the first encrypted data bundle can be transmitted in a first communication such as being embedded in a URI. In an aspect, the first encrypted data bundle can be configured as a pass-through (e.g., not decrypted) at a recipient application or web page. For example, the first encrypted data bundle can be embedded in a URI and can be returned to the source of the first encrypted data bundle as part of a return query. This can be accomplished without the application decrypting the underlying data.

At block 314, the first encrypted data bundle can be received (e.g., returned) in a second communication such as a request for an access token or as a request for access including an access token or representation thereof. In an aspect, the received first encrypted data bundle can be decrypted. As an example, a service such as the managed directory service 140 can be configured to encrypt and/or decrypt data bundles such that the encrypted data bundles are pass-through encrypted data to the recipient applications and web browsers. As such, this "internal" encryption can allow information to be passed between various components and subsystems of the managed directory service 140 in a secure manner. By passing the encrypted data bundles rather than the actual tokens, the database of access information can be minimized and simply referenced by the encrypted data bundles.

At block 316, a second encrypted data bundle can be generated based at least in part on the user identifier associated with the user credentials and the data type. The second encrypted data bundle can include at least the user identifier associated with the user credentials and a second data type.

At block 318, the second encrypted data bundle can be transmitted, for example to a source of the request for access, to facilitate access to the first computing system service provided by the computing resource service provider. In an aspect, the end user device may be automatically redirected (e.g., via a URI) to a page that provides access to the requested service. After the end user device is provided with access to the service, the process 300 may end, as shown in block 320.

Figure 4:
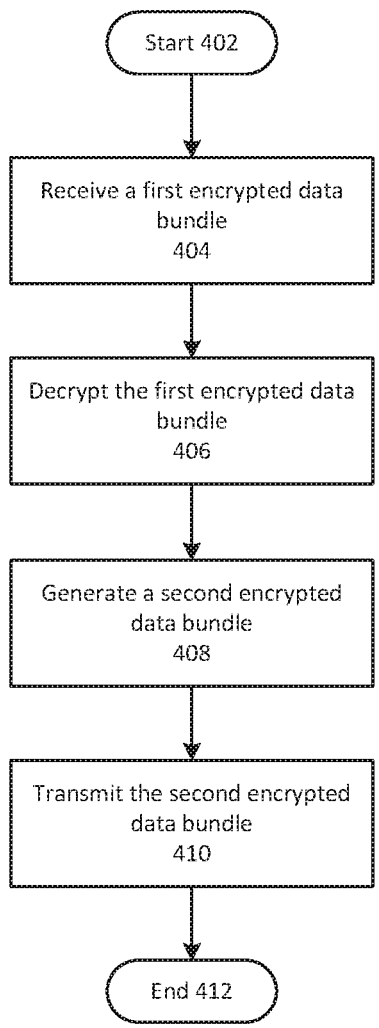
FIG. 4 illustrates a process for providing access to an application or service.

FIG. 4 illustrates a process 400 for providing access to a service. As an example, the managed directory service 140 of FIG. 1 can be configured to execute the process 400. The process 400 can begin at block 402. However, the process 400 can be executed in any order or sequence and can comprise any number of operations including a single operation.

At block 404, a first encrypted data bundle can be received. In an aspect, the first data bundle can include at least a user identifier associated with the user credentials and a first data type and can be encrypted using various encryption techniques such as AES. The first data type can comprise an authorization code, an access token, or a refresh token, or a combination thereof. The first encrypted data bundle can comprise a session identifier. As an example, the session identifier can represent each authentication attempt and/or successful authentication with a unique identifier. As a further example, even when the same user credentials are authenticated in separate authentication attempts, the session identifier can be used to distinguish one attempt from another.

At block 406, first encrypted data bundle can be decrypted to expose at least the user identifier and the first data type. In an aspect, a service such as the managed directory service 140 can be configured to encrypt and decrypt the data bundles such that the encrypted data bundles are pass-through encrypted data to the recipient applications and web browsers. As such, this "internal" encryption can allow information to be passed between various components and subsystems of the managed directory service 140 in a secure manner. By passing the encrypted data bundles rather than the actual tokens, the database of access information can be minimized and simply referenced by the encrypted data bundles.

At block 408, a second encrypted data bundle can be generated based at least in part on at least the user identifier and the first data type. The second encrypted data bundle can include at least the user identifier associated with the user credentials and a second data type. The second data type can comprise an authorization code, an access token, or a refresh token, or a combination thereof. The second data type can be the same or different from the first data type. In an aspect, the first data type can be an authorization code, wherein the user identifier can be used to locate information necessary to generate the second encrypted data bundle representing an access token (e.g., the second data type is an access token).

At block 410, the second encrypted data bundle can be transmitted to a recipient. The second encrypted data bundle can be configured to facilitate access to a computing system service provided by a computing resource service provider. In an aspect, the recipient may be automatically redirected (e.g., via a URI) to a page that provides access to the requested service. After the recipient is provided with access to the service, the process 400 may end, as shown in block 412. In an aspect, because all of the data being returned to the managed directory services are in the form of an encrypted data bundle, it becomes quick and easy to identify the user, domain, and authenticated session associated with the encrypted data bundle. Access removal for an authenticated session and all its related encrypted data bundles can be performed by invalidating the base authenticated session. If all requests for access and additional encrypted data bundles are required to validate the authenticated session, no further action is required. Given that all vended tokens may be emulated as encrypted data bundles, the access service (e.g., oauth) no longer has to keep track of every individual access token, authorization code, and access token it sends out. Only an authenticated session identifier needs to be stored, thereby reducing storage overhead. These and other advantages may be realized by implementing the operations disclosed herein.

Figure 5:
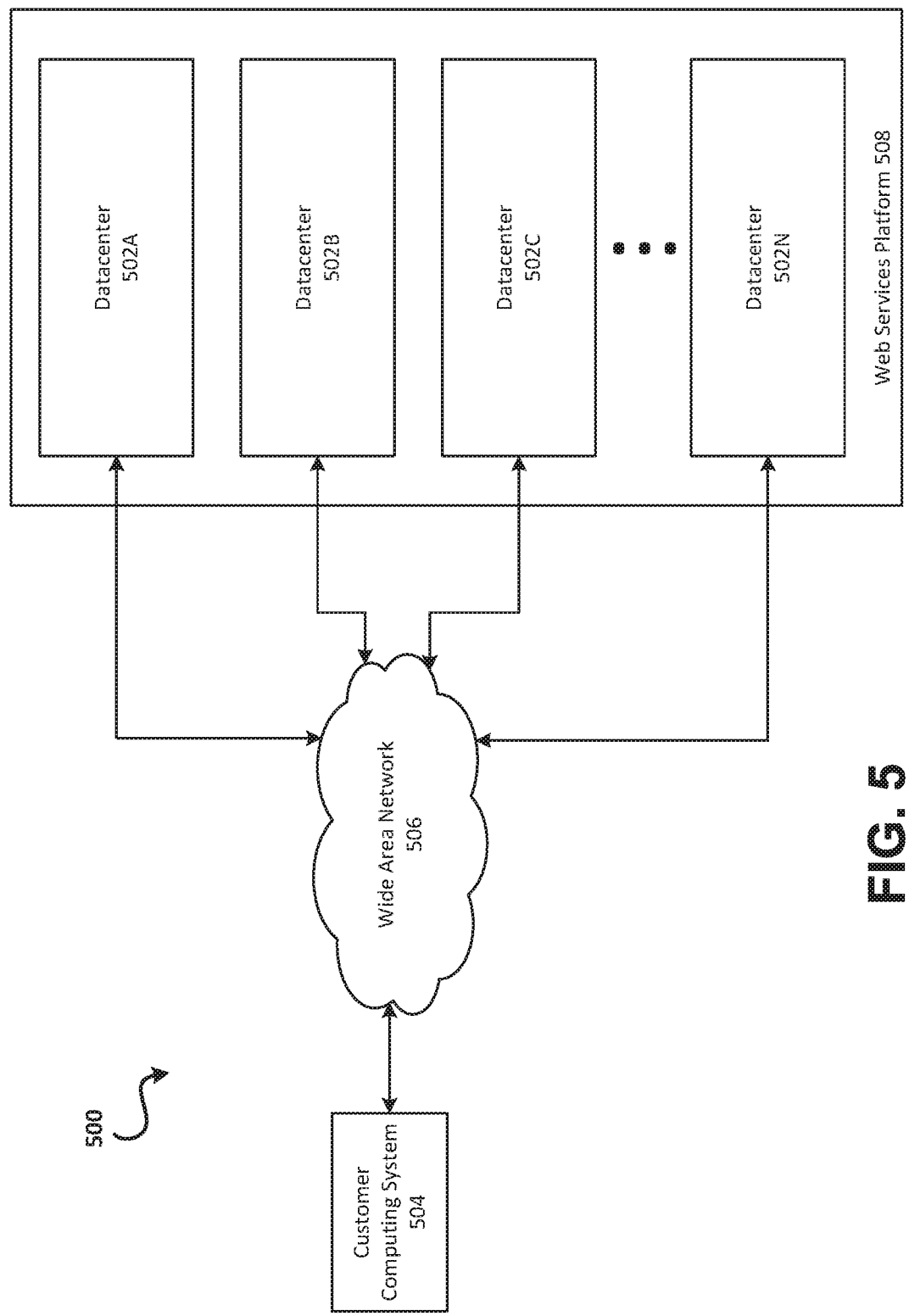
FIG. 5 depicts a web services platform, such as the example network environment in FIG. 1, that comprises a plurality of datacenters.
Figure 6:
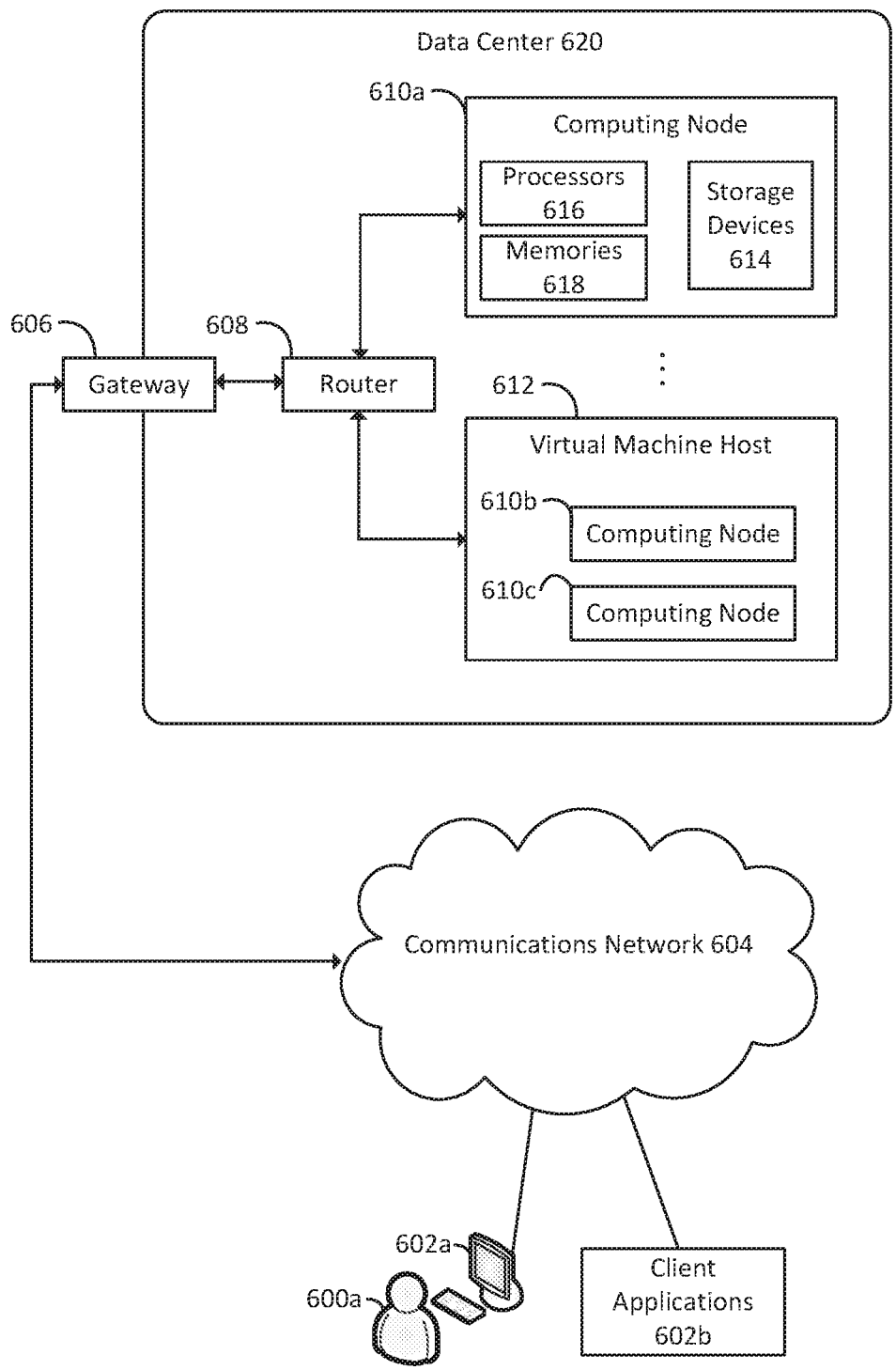
FIG. 6 depicts a datacenter, such as in FIG. 5.
Figure 7:
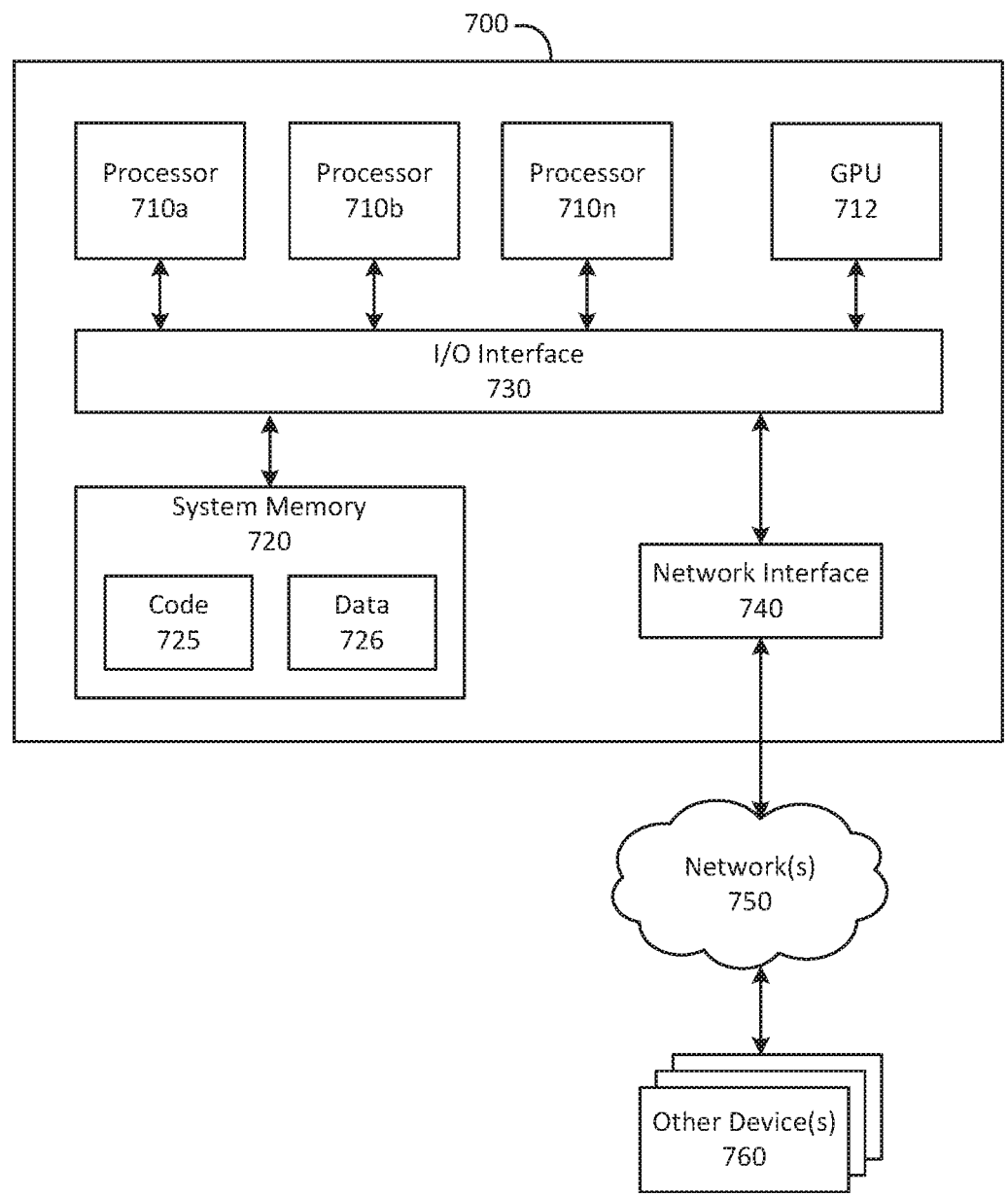
FIG. 7 depicts a computer that may be part of a datacenter, such as in FIG. 5.

FIGS. 5-7 are similar to FIG. 1 in that they depict example operating environments in which aspects disclosed herein may be implemented, and said figures depict these operating environments at varying levels of granularity. FIG. 5 generally depicts a web services platform that comprises a plurality of datacenters. FIG. 6 generally depicts a datacenter that comprises a plurality of computers. FIG. 7 generally depicts a computer that may be part of a datacenter. Any of the devices, computers, servers, and/or instance may be considered network resources, as used herein.

It may be appreciated that the operating environments of FIGS. 5-7 may be used to implement aspects of the operating environment of FIG. 1. For example, the managed directory service 140 and its components may be implemented in web services platform 508 of FIG. 5. Turning now to details of FIG. 5, this figure depicts an example of a suitable computing environment in which aspects described herein may be implemented. A cloud service provider (such as web services platform 508) may configure the illustrated computing environment to host virtual clouds of entities and to enable communication paths between these virtual clouds that may otherwise be isolated. In particular, FIG. 5 is a system and network diagram that shows an illustrative operating environment 500 that includes a web services platform 508 for implementing virtual clouds and for providing on-demand access to compute resources, such as virtual machine instances. Web services platform 508 may provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by web services platform 508 may be enabled by at least one datacenters 502A-502N, which may be referred herein singularly as "datacenter 502" or in the plural as "datacenters 502." Datacenters 502 may be facilities that house and operate computer systems and associated components and may include redundant and backup power, communications, cooling, and security systems. Datacenters 502 may be located in a same geographical area, such as in a same facility, and may be interconnected using private networks, such as high-speed fiber optic networks, controlled and managed by a service provider of web services platform 508. Datacenters 502 may also be distributed across geographically disparate locations and may be interconnected in part using public networks, such as the Internet. One illustrative configuration for datacenter 502 that implements the concepts and technologies disclosed herein is described below with regard to FIG. 5.

Entities of web services platform 508 may access the compute resources (e.g., network resources) provided by datacenters 502 over a wide area network (WAN) 506. Although a WAN is illustrated in FIG. 5, it should be appreciated that a local area network (LAN), the Internet, or any other networking topology known in the art that connects datacenters 502 to remote entities and other users may be utilized. It should also be appreciated that combinations of such networks may also be utilized.

An entity or other entities that are customers of web services platform 508 may utilize a customer computing system 504 to access the compute resources provided by datacenters 502. Customer computing system 504 comprises a computer capable of accessing web services platform 508, such as a server computer, a desktop or laptop personal computer, a tablet computer, a wireless telephone, a PDA, an e-reader, a game console, a set-top box, or any other network resource.

As is described in greater detail below, customer computing system 504 may be utilized to configure aspects of the compute resources provided by web services platform 508. In this regard, web services platform 508 may provide a web interface through which aspects of its operation may be configured through the use of a web browser application program executing on customer computing system 504. Alternatively, a stand-alone application program executing on customer computing system 504 may access an application programming interface (API) (not shown) exposed by web services platform 508 for performing the configuration operations. Other mechanisms for configuring the operation of web services platform 508, including launching new virtual machine instances on web services platform 508, may also be utilized.

According to aspects disclosed herein, capacities of purchased compute resources provided by web services platform 508 may be scaled in response to demand. In this regard, scaling refers to the process of instantiating, which may also be referred to herein as "launching" or "creating,"

or terminating, which may also be referred to herein as "de-scaling," instances of compute resources in response to demand.

Web services platform 508 may also be configured with a deployment component to assist entities in the deployment of new instances of compute resources. The deployment component may receive a configuration from an entity that may include data describing how new instances should be configured. For example, the configuration may specify at least one applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c (e.g., network resources) within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620 (which may be similar in data center 502), may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618 and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities, and so forth. The computing nodes can be or comprise network resources. Network resources may be services or compute processes executing via one or more computing nodes. A computing node may refer to various types of computing resources, such as personal computers, servers, clustered computing devices, and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

In at least some embodiments, a server that implements a portion or all of one or more of the technologies described herein may include a general-purpose computer system that includes or is configured to access one or more computer-accessible media.

FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or network resources.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other network resource may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of facilitating access to one or more computing system services provided by a computing resource service provider, the method comprising:
    receiving a request to access a first computing system service provided by the computing resource service provider;
    generating an encrypted data bundle comprising at least a user identifier and a data type, wherein the user identifier is indicative of a user attempting to access the first computing system service;
    transmitting the encrypted data bundle to a recipient, wherein the encrypted data bundle is configured as pass-through data such that the recipient receives and transmits the encrypted data bundle without decrypting the encrypted data bundle; and
    receiving, from the recipient of the encrypted data bundle, a communication comprising the encrypted data bundle.

2. The method of claim 1, wherein the data type comprises an authorization code, an access token, or a refresh token, or a combination thereof.

3. The method of claim 1, wherein the recipient comprises an application, a web page, or a user device, or a combination thereof.

4. The method of claim 1, further comprising:
    receiving user credentials associated with a user; and
    attempting to authenticate the user credentials, wherein the encrypted data bundle is generated in response to an authentication of the user credentials.

5. A method of facilitating access to one or more computing system services provided by a computing resource service provider, the method comprising:
    receiving a request to access a first computing system service provided by the computing resource service provider;
    generating an encrypted data bundle comprising at least a user identifier and a data type, wherein the user identifier is indicative of a user attempting to access the first computing system service;
    transmitting, by one or more computing devices, the encrypted data bundle to a recipient, Wherein the encrypted data bundle is configured as pass-through data; and
    receiving, by the one or more computing devices and from the recipient of the encrypted data bundle, a communication comprising the encrypted data bundle, wherein the received encrypted data bundle is configured to facilitate access, by the recipient, to the first computing system service provided by the computing resource service provider.

6. The method of claim 5, wherein the data type comprises an authorization code, an access token, or a refresh token, or a combination thereof.

7. The method of claim 5, wherein the encrypted data bundle comprises an expiration time, name directory, domain identifier, or version, or a combination thereof.

8. The method of claim 5, wherein the encrypted data bundle is transmitted as part of a redirection universal resource identifier or a request for an access token, or both.

9. The method of claim 5, wherein the recipient comprises an application, a web page, or a user device, or a combination thereof.

10. The method of claim 5, wherein the recipient is a source of the request to access.

11. The method of claim 5, wherein the encrypted data bundle is configured such that the recipient receives and transmits the encrypted data bundle without decrypting the encrypted data bundle.

12. The method of claim 5, further comprising:
    receiving user credentials associated with a user; and
    attempting to authenticate the user credentials, wherein the encrypted data bundle is generated in response to an authentication of the user credentials.

13. A method of facilitating access to one or more computing system services provided by a computing resource service provider, the method comprising:
    receiving a first encrypted data bundle comprising at least a user identifier and a first data type;
    decrypting the first encrypted data bundle to expose at least the user identifier and the first data type;
    generating, based at least in part on the at least the user identifier and the first data type, a second encrypted data bundle comprising at least the user identifier and a second data type;
    transmitting, by one or more computing devices, the second encrypted data bundle to a recipient; and
    receiving, by the one or more computing devices, the second encrypted data bundle, wherein the second encrypted data bundle is configured to facilitate access, by the recipient, to a computing system service provided by a computing resource service provider.

14. The method of claim 13, wherein one or more of the first data type and the second data type comprises an authorization code, an access token, or a refresh token, or a combination thereof.

15. The method of claim 13, wherein one or more of the first encrypted data bundle and the second encrypted data bundle comprises an expiration time, name directory, domain identifier, or version, or a combination thereof.

16. The method of claim 13, wherein the first encrypted data bundle is received as part of a redirection universal resource identifier or a request for an access token, or both.

17. The method of claim 13, wherein the recipient comprises an application, a web page, or a user device, or a combination thereof.

18. The method of claim 13, wherein the recipient is a source of the first encrypted data bundle.

19. The method of claim 13, wherein the second encrypted data bundle is configured as pass-through data such that the recipient receives and transmits the second encrypted data bundle without decrypting the second encrypted data bundle.

20. The method of claim 13, wherein one or more of the first encrypted data bundle and the second encrypted data bundle has a fixed bit length.

\* \* \* \* \*